3,097,200
17-AMINOANDROSTANES
Fred A. Kincl, Mexico City, Mexico, assignor, by mesne assignments, to Syntex Corporation, a corporation of Panama
No Drawing. Filed Jan. 3, 1962, Ser. No. 164,184
14 Claims. (Cl. 260—239.5)

The present invention relates to novel cyclopentanophenanthrene derivatives and to a process for the production thereof.

More particularly the present invention relates to novel 17β-amino androstane derivatives.

The novel compounds of the present invention which inhibit the function of the pituitary gland without having marked androgenic or toxic properties are represented by the following formulas:

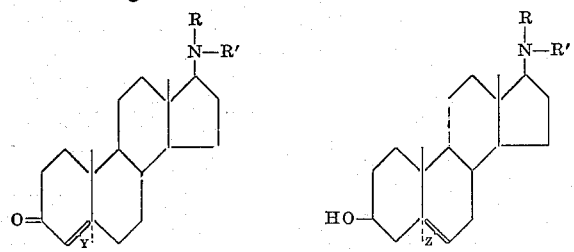

In the above formulas Y may be a double bond or a saturated linkage between C–4 and C–5; Z represents a double bond or a saturated linkage between C–5 and C–6; R represents hydrogen or lower alkyl; $R^1$ represents lower alkyl, or an aryl or aralkyl group of up to 10 carbon atoms and R and $R^1$ together with the nitrogen atom represent a heterocyclic radical selected from the group consisting of pyrrolidino, piperidino, morpholino, piperazino and the like.

The novel compounds of the present invention are prepared by the method illustrated by the following equation:

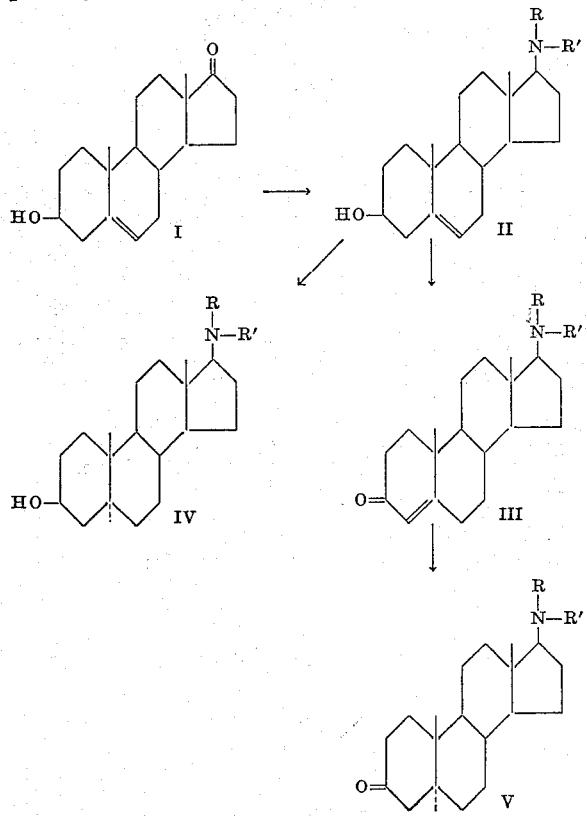

In the above formulas R and $R^1$ have the same meaning as hereinbefore set forth.

In practicing the process just outlined the starting Δ⁵-androsten-3β-ol-17-one (I) is treated with an amine, as for example pyrrolidine, piperidine, benzylmethylamine or diethylamine, in the presence of formic acid at a temperature within the range of 120° C. to 180° C. for a period of time of the order of 5 to 15 hours, thus affording the corresponding 17β-amino-Δ⁵-androsten-3β-ol (II). Conventional hydrogenation of this compound with hydrogen in the presence of a suitable catalyst such as platinum oxide yields the corresponding 17β-amino androstan-3β-ol (IV).

Following a second sequence of reactions the 17β-amino-Δ⁵-androsten-3β-ol derivative (II) upon Oppenauer oxidation gives the respective 17β-amino-Δ⁴-androsten-3-one (III) which after treatment with an alkali metal such as lithium in liquid ammonia yields the corresponding 17β-amino-androstan-3-one derivative (V).

In particular 17β-ethylamino-Δ⁵-androstan-3β-ol may also be prepared from pregnenolone acetate as follows: the latter compound upon conventional treatment with hydroxylamine hydrochloride yields the corresponding 20-ketoxime; treatment of this oxime with a chloride of a sulfonic acid preferably p-acetamido-benzene sulfonyl chloride in a suitable solvent such as pyridine yields 17β-N-acetoxy-amino-Δ⁵-androsten-3β-ol-3-acetate which upon reduction, preferably with lithium aluminum hydride, yields the desired 17β-ethylamino Δ⁵-androsten-3β-ol.

The quaternary ammonium salts of the above described 17β-amines are valuable derivatives which have a satisfactory solubility in water and may be administered by injection. These salts are prepared by conventional treatment of a 17β-amine of the type defined above with an organic or inorganic acid, as for example, hydrochloric acid, sulfuric acid or oxalic acid, or a lower alkyl halide such as methyl iodide, ethyl bromide and the type conventionally employed in the therapeutic field.

The following specific examples serve to illustrate but are not intended to limit the scope of the present invention.

*Example I*

A mixture of 25 g. of pregnenolone acetate, 30 cc. of pyridine, 130 cc. of 95% ethanol and 8.5 g. of hydroxylamine hydrochloride was refluxed for 30 minutes and cooled in ice. The precipitate was collected, washed with hot water and dried, thus giving the 20-ketoxime of the starting compound.

A solution of 24 g. of the oxime in 70 cc. of pyridine was treated with 30 g. of p-acetamidobenzenesulfonyl chloride in 70 cc. of pyridine and stirred for 2 hours at 10° C. and 2 hours at room temperature. The mixture was poured into ice-water, and the brown gummy precipitate was extracted with chloroform, washed with water, dried and evaporated. Crystallization of the residue from methylene chloride-hexane (decanting first from a colored oil which separated) afforded 17β-N-acetoxyamino-Δ⁵-androsten-3β-ol-3-acetate.

*Example II*

A solution of 10 g. of the product of the preceding example in 500 cc. of tetrahydrofuran was added over a 30 minute period to a stirred suspension of 10 g. of lithium aluminum hydride in 500 cc. of anhydrous tetrahydrofuran. The mixture was refluxed for 2 hours, then cooled and cautiously treated with 50 cc. of ethyl acetate and 20 cc. of water. Solid sodium sulfate was added, the inorganic material filtered off and thoroughly washed with hot ethyl acetate, the combined organic solutions upon evaporation yielded a crude material, which was purified by crystallization from acetone-hexane thus giving 17β-ethyl-amino-Δ⁵-androsten-3β-ol.

Example III

A mixture of 1 g. of Δ⁵-androsten-3β-ol-17-one, 1 cc. of pyrrolidine and 1 cc. of formic acid was heated under a condenser at 170° C. for 12 hours. The reaction mixture was then cooled and treated with 10 cc. of 3 N hydrochloric acid. The formed amine hydrochloride was filtered off and washed with water and ether. The solid was treated with 25 cc. of a 10% aqueous potassium hydroxide solution and the resulting mixture was extracted with ether. The organic extract was washed with water, dried over anhydrous sodium sulfate and evaporated to dryness. Crystallization from acetone-methylene chloride afforded 17β-pyrrolidino-Δ⁵-androsten-3β-ol.

Example IV

Following exactly the technique described in the foregoing example except that pyrrolidine was substituted by piperidine, there was obtained 17β-piperidino-Δ⁵-androsten-3β-ol.

Example V

Using exactly the same conditions described in Example III except that pyrrolidine was substituted by N-benzylmethylamine, there was obtained 17β-(N-benzylmethylamino)-Δ⁵-androsten-3β-ol.

Example VI

Following the procedure described in Example III except that pyrrolidine was substituted by diethylamine and the reaction mixture was kept at 130° C. for 5 hours, there was obtained 17β-diethylamino-Δ⁵-androsten-3β-ol.

Example VII

Following the method described in Example III except that pyrrolidine was substituted by aniline there was obtained 17β-N-phenylamino-Δ⁵-androsten-3β-ol.

Example VIII

A solution of 1 g. of 17β-ethylamino-Δ⁵-androsten-3β-ol in 80 cc. of toluene and 20 cc. of cyclohexanone was dried by distilling off 10 cc. of the solvent. A solution of 1 g. of aluminum isopropoxide dissolved in 7 cc. of anhydrous toluene was then added and the mixture was refluxed for 45 minutes; 4 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated to dryness. Crystallization from acetone-hexane afforded 17β-ethylamino-Δ⁴-androsten-3-one.

Following the same procedure there were treated the starting compounds listed below, affording the corresponding products hereinafter indicated.

| Starting Compound | Product |
| --- | --- |
| 17β-pyrrolidino-Δ⁵-androsten-3β-ol | 17β-pyrrolidino-Δ⁴-androsten-3-one. |
| 17β-piperidino-Δ⁵-androsten-3β-ol | 17β-piperidino-Δ⁴-androsten-3-one. |
| 17β-N-benzylmethylamino-Δ⁵-androsten-3β-ol. | 17β-N-benzylmethylamino-Δ⁴-androsten-3-one. |
| 17β-diethylamino-Δ⁵-androsten-3β-ol. | 17β-diethylamino-Δ⁴-androsten-3-one. |
| 17β-N-phenylamino-Δ⁵-androsten-3β-ol. | 17β-N-phenylamino-Δ⁴-androsten-3-one. |

Example IX

A solution of 1 g. of 17β-ethylamino-Δ⁴-androsten-3-one in 20 cc. of dioxane-ether (1:1) was added in a steady stream to a solution of 0.1 g. of lithium in 100 cc. of anhydrous liquid ammonia with good stirring. At the end of the addition the blue color was discharged by the addition of 5 g. of ammonium chloride and the ammonia was allowed to evaporate. The product was extracted with ether, washed with water, dried and the ether evaporated to afford a gum which was adsorbed from 100 cc. of benzene onto 50 g. of alumina. Elution with benzene-ether afforded a product which upon recrystallization from acetone-hexane gave 17β-ethylamino-androsten-3-one.

Following the same technique were treated the starting compounds under I thus affording the corresponding products under II.

| Starting Compound | Product |
| --- | --- |
| 17β-pyrrolidino-Δ⁴-androsten-3-one | 17β-pyrrolidino-androstan-3-one. |
| 17β-piperidino-Δ⁴-androsten-3-one | 17β-piperidino-androstan-3-one. |
| 17β-N-benzylmethylamino-Δ⁴-androsten-3-one. | 17β-N-benzylmethylamino-androstan-3-one. |
| 17β-diethylamino-Δ⁴-androsten-3-one. | 17β-diethylamino-androstan-3-one. |
| 17β-N-phenylamino-Δ⁴-androsten-3-one. | 17β-N-phenylamino-androstan-3-one. |

Example X

A solution of 2.0 g. of 17β-ethylamino-Δ⁵-androsten-3β-ol in 100 cc. of ethyl acetate was shaken with 100 mg. of platinum oxide catalyst in a hydrogen atmosphere until the gas uptake corresponded to one mol. The catalyst was filtered off and the filtrate evaporated to dryness. Recrystallization from acetone-hexane afforded 17β-ethylamino-androstan-3β-ol.

When applying the above technique to the following starting compounds under I there were obtained the corresponding products under II:

| Starting Compound | Product |
| --- | --- |
| 17β-pyrrolidino-Δ⁵-androsten-3β-ol | 17β-pyrrolidino-androstan-3β-ol. |
| 17β-piperidino-Δ⁵-androsten-3β-ol | 17β-piperidino-androstan-3β-ol. |
| 17β-N-benzylmethylamino-Δ⁵-androsten-3β-ol. | 17β-N-benzylmethylamino-androstan-3β-ol. |
| 17β-diethylamino-Δ⁵-androsten-3β-ol. | 17β-diethylamino-androstan-3β-ol. |
| 17β-N-phenylamino-Δ⁵-androsten-3β-ol. | 17β-N-phenylamino-androstan-3β-ol. |

I claim:
1. A compound of the following formula:

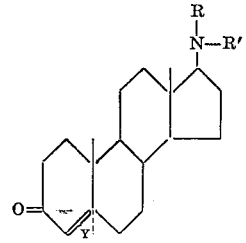

wherein Y is selected from the group consisting of a double bond and a saturated linkage between C–4 and C–5; R is a member of the group consisting of hydrogen and lower alkyl; R¹ is selected from the group consisting of an aryl group and an aralkyl group, each containing up to 10 carbon atoms and R and R¹ together with the nitrogen atom form a heterocyclic radical selected from the group consisting of pyrrolidino, piperidino, morpholino and piperazino.

2. 17β-pyrrolidino-Δ⁴-androsten-3-one.
3. 17β-piperidino-Δ⁴-androsten-3-one.
4. 17β-N-benzylmethylamino-Δ⁴-androsten-3-one.
5. 17β-N-phenylamino-Δ⁴-androsten-3-one.
6. 17β-pyrrolidino-androstan-3-one.
7. 17β-piperidino-androstan-3-one.
8. A compound of the following formula:

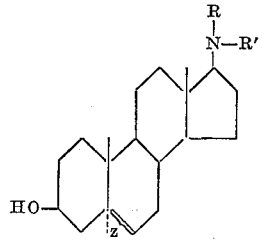

wherein Z is selected from the group consisting of a double bond and a saturated linkage between C-5 and C-6; R is a member of the group consisting of hydrogen and lower alkyl; $R^1$ is selected from the group consisting of an aryl group and an aralkyl group, each containing up to 10 carbon atoms and R and $R^1$ together with the nitrogen atom form a heterocyclic radical selected from the group consisting of pyrrolidino, piperidino, morpholino and piperazino.

9. 17β-pyrrolidino-$\Delta^5$-androsten-3-β-ol.
10. 17β-piperidino-$\Delta^5$-androsten-3β-ol.
11. 17β-N-benzylmethylamino-$\Delta^5$-androsten-3β-ol.
12. 17β-N-phenylamino-$\Delta^5$-androsten-3β-ol.
13. 17β-pyrrolidino-androstan-3β-ol.
14. 17β-piperidino-androstan-3β-ol.

References Cited in the file of this patent

UNITED STATES PATENTS

| | | |
|---|---|---|
| 2,582,258 | Julian et al. | Sept. 17, 1949 |
| 2,705,238 | Julian et al. | Mar. 29, 1955 |
| 3,009,925 | Babcock | Nov. 21, 1961 |